US012621714B2

(12) United States Patent     (10) Patent No.:   US 12,621,714 B2
Lin et al.     (45) Date of Patent:     May 5, 2026

(54) DEVICE AND METHOD OF PERFORMING CONTENT CHANNEL GENERATION

(71) Applicant: Realtek Semiconductor Corp., HsinChu (TW)

(72) Inventors: Jhe-Yi Lin, HsinChu (TW); Wun-Ci Su, HsinChu (TW); Yu-Jhao Yang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 387 days.

(21) Appl. No.: 18/143,081

(22) Filed: May 4, 2023

(65) Prior Publication Data

US 2023/0362724 A1     Nov. 9, 2023

(30) Foreign Application Priority Data

May 4, 2022    (TW) .................................. 111116750

(51) Int. Cl.
    *H04W 28/08*     (2023.01)
    *H04W 28/02*     (2009.01)
    (Continued)

(52) U.S. Cl.
    CPC ..... *H04W 28/082* (2023.05); *H04W 28/0252* (2013.01); *H04W 72/52* (2023.01)

(58) Field of Classification Search
    CPC ..... H04W 28/08; H04W 28/02; H04W 72/52; H04W 72/04; H04W 72/23; H04W 72/12;
    (Continued)

(56) References Cited

U.S. PATENT DOCUMENTS

| | | |
|---|---|---|
| 6,912,229 B1 | 6/2005 | Lauro |
| 7,260,716 B1 | 8/2007 | Srivastava |

(Continued)

FOREIGN PATENT DOCUMENTS

| | | |
|---|---|---|
| TW | 201713160 A | 4/2017 |
| TW | 202143770 A | 11/2021 |
| WO | 2021/204209 A1 | 10/2021 |

OTHER PUBLICATIONS

Su et al., the specification, including the claims, and drawings in the U.S. Appl. No. 18/143,048, filed May 3, 2023.

(Continued)

*Primary Examiner* — Man U Phan
(74) *Attorney, Agent, or Firm* — Winston Hsu

(57)     ABSTRACT

A content channel generation device includes: a splitting circuit for generating resource units according to resource assignments; a resource unit assignment circuit for generating a full binary tree according to the resource units; a node computing circuit for generating a minimum full binary tree according to the full binary tree; a load balance circuit for generating user field numbers corresponding to content channels according to the minimum full binary tree and a load balance function; a merging circuit for generating a traversal result of the minimum full binary tree according to a traversal algorithm, and for generating a merged traversal result according to the traversal result; and a common field generation circuit for generating a resource assignment indicator according to the merged traversal result to generate a common field.

16 Claims, 9 Drawing Sheets

(51) Int. Cl.
    *H04W 28/082*     (2023.01)
    *H04W 72/52*     (2023.01)

(58) Field of Classification Search
    CPC ..... H04W 72/20; H04W 74/00; H04W 74/04;
        H04W 24/02; H04W 24/12; H04W 28/06;
        H04W 28/09; H04L 5/00; H04L 1/00;
        H04L 12/24; H04L 12/80; H04L 41/08;
        H04L 47/12; G06F 9/50; G06F 9/48;
        G06F 9/30; G06F 16/90; G06F 16/95
    USPC ........................................................ 370/236
    See application file for complete search history.

(56)         References Cited

U.S. PATENT DOCUMENTS

| 7,710,963 | B1 * | 5/2010 | Jain | ........................ | H04L 49/201 |
| | | | | | 370/432 |
| 9,867,189 | B2 * | 1/2018 | Lee | ........................ | H04B 7/0452 |
| 10,123,330 | B2 | 11/2018 | Josiam | | |
| 10,841,647 | B2 * | 11/2020 | Zavesky | .............. | H04N 21/252 |
| 12,229,590 | B2 * | 2/2025 | Lin | ........................ | G06F 9/4881 |
| 2017/0094664 | A1 | 3/2017 | Lee | | |
| 2021/0349754 | A1 | 11/2021 | Lin | | |
| 2023/0198696 | A1 * | 6/2023 | Huang | .................. | H04L 1/0041 |
| | | | | | 370/329 |
| 2023/0359502 | A1 * | 11/2023 | Su | ........................ | H04L 47/125 |
| 2025/0031214 | A1 * | 1/2025 | Huang | .................. | H04W 40/24 |
| 2025/0182967 | A1 * | 6/2025 | Yamashita | .............. | H01G 4/30 |
| 2025/0192958 | A1 * | 6/2025 | Park | ........................ | H04L 5/00 |

OTHER PUBLICATIONS

IEEE Computer Society, IEEE P802.11be TM/D1.1 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), Jul. 2021.

* cited by examiner

| Resource assignment indicator | 1 | 2 | 3 | 4 | 5 | 6 | 7 | 8 | 9 |
|---|---|---|---|---|---|---|---|---|---|
| 0 (000000000) | 26 | 26 | 26 | 26 | 26 | 26 | 26 | 26 | 26 |
| 1 (000000001) | 26 | 26 | 26 | 26 | 26 | 26 | 26 | 52 | 52 |
| ... | | | | | | | | | |
| 49 (000110001) | | 106+26 | | | | | 52+26 | | 26 |
| 50 (000110010) | | | 106 | | | | 106+26 | | |
| 51 (000110011) | 26 | | 52+26 | | | | 106+26 | | |
| 52 (000110100) | 26 | | 106 | | 26 | | 52+26 | | 26 |
| 53 (000110101) | 26 | | 52+26 | | 26 | | 106 | | |
| 54 (000110110) | 26 | | 52+26 | | 26 | | 52+26 | | 26 |
| 55 (000110111) | 52 | | | 52+26 | | 52 | | 52 | 52 |
| ... | | | | | | | | | |
| 96-103 (001100$y_2y_1y_0$) | MRU of [ ]-242-484 | | | | | | | | |
| ... | | | | | | | | | |

DEVICE AND METHOD OF PERFORMING CONTENT CHANNEL GENERATION

BACKGROUND OF THE INVENTION

1. Field of the Invention

The present invention relates to a device and a method used in a communication system, and more particularly, to a device and a method of performing content channel generation.

2. Description of the Prior Art

In a standard communication system, a transmitter uses resource units (RUs), a sorting algorithm and a linked sequence to generate a user field for allocating a user resource, wherein the RUs are generated by splitting the bandwidth. In a case where the transmitter uses multiple RUs to assign the user resource, gaps between the multiple RUs are difficult to assign to the user resource, which reduces the bandwidth usage efficiency. In addition, the sorting algorithm and the linked sequence have a high complexity (e.g. time complexity), which makes them difficult to be realized in an embedded system. Further, an excessively long user field generated according to the sorting algorithm and the linked sequence may reduce the bandwidth usage efficiency. Thus, how to improve the above mentioned problems to obtain the shortest user specific field and generate the shortest content channel is an important problem to be solved.

SUMMARY OF THE INVENTION

The present invention therefore provides a processing device and a method for executing a programming language function of a control device to solve the abovementioned problem.

A content channel generation device comprises: a splitting circuit, for generating a plurality of resource units (RUs) according to a plurality of resource assignments; an RU assignment circuit, coupled to the splitting circuit, for generating a full binary tree according to the plurality of RUs; a node computing circuit, coupled to the RU assignment circuit, for generating a minimum full binary tree according to the full binary tree; a load balance circuit, coupled to the node computing circuit, for generating a plurality of user field numbers corresponding to a plurality of content channels according to the minimum full binary tree and a load balance function; a merging circuit, coupled to the load balance circuit, for generating a traversal result of the minimum full binary tree according to a traversal algorithm, and for generating a merged traversal result according to the traversal result; and a common field generation circuit, coupled to the merging circuit, for generating a resource assignment indicator according to the merged traversal result to generate a common field.

A method for performing a content channel generation comprises: generating a plurality of resource units (RUs) according to a plurality of resource assignments; generating a full binary tree according to the plurality of RUs; generating a minimum full binary tree according to the full binary tree; generating a plurality of user field numbers corresponding to a plurality of content channels according to the minimum full binary tree and a load balance function; generating a traversal result of the minimum full binary tree according to a traversal algorithm, and generating a merged traversal result according to the traversal result; and generating a resource assignment indicator according to the merged traversal result to generate a common field.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram of a full binary tree for a plurality of resource units in a 320 MHz bandwidth according to an example of the present invention.

FIG. 7 is a resource unit assignment table according to an example of the present invention.

DETAILED DESCRIPTION

Figure 1:
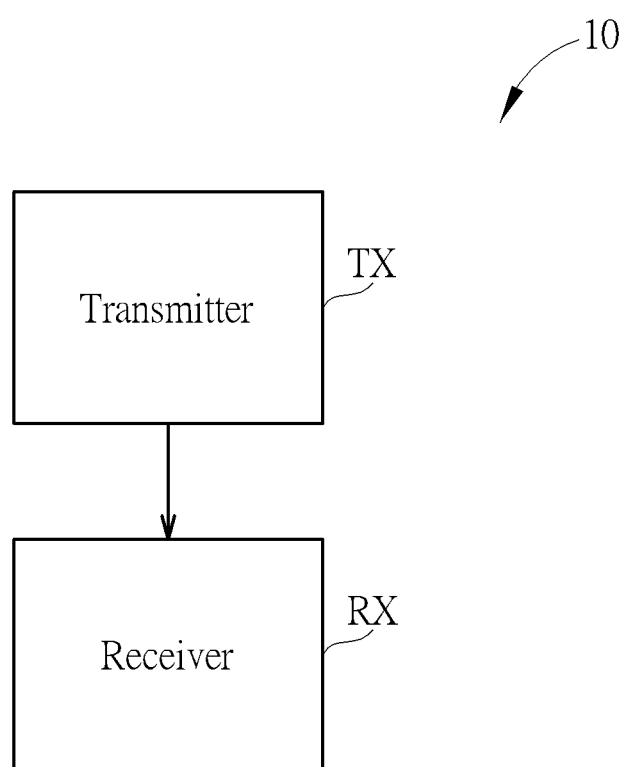
FIG. 1 is a schematic diagram of a communication system according to an example of the present invention.

FIG. 1 is a schematic diagram of a communication system 10 according to an example of the present invention. The communication system 10 is briefly composed of a transmitter TX and a receiver RX. In FIG. 1, the transmitter TX and the receiver RX are used for illustrating the structure of the communication system 10, and other components are not shown. The communication system 10 may be a wireless communication system such as a wireless local area network (WLAN), a Long Term Evolution (LTE) system, an LTE-advanced (LTE-A) system or a 5th generation (5G) system. The transmitter TX may be an access point (AP) in a wireless local area network (LAN). In addition, the transmitter TX and the receiver RX may be realized via a device (s) such as a mobile phone and a laptop, but not limited herein. The transmitter TX and the receiver RX may support an Institute of Electrical and Electronics Engineers (IEEE) 802.11 standard (e.g. IEEE 802.11AX, 802.11be or a subsequent version). The IEEE 802.11 standard may support an Orthogonal Frequency Division Multiple Access (OFDMA) and/or a Multi-User Multiple-Input Multiple-Output (MU-MIMO). In order to inform the receiver RX of transmission information of all scheduled stations (STAs), the IEEE 802.11 standard defines an EHT-SIG field of an extremely high throughput multi-user physical protocol data unit (EHT-MU PPDU). The EHT-MU PPDU may transmit a zero data packet format, a single-user packet format, a multi-user packet format or an orthogonal frequency division multiple access packet format.

Figure 2:
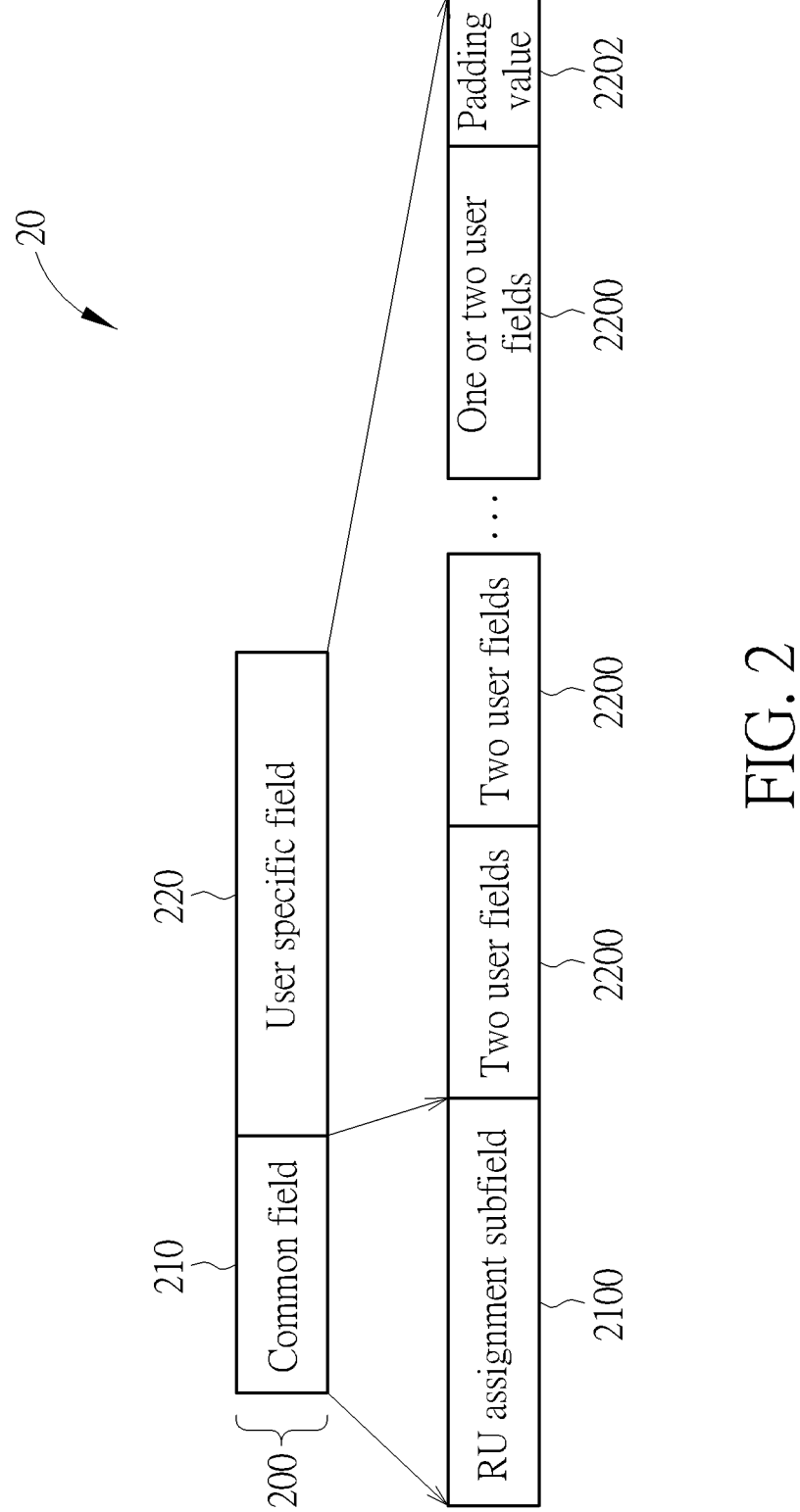
FIG. 2 is a schematic diagram of an EHT-SIG field according to an example of the present invention.

FIG. 2 is a schematic diagram of an EHT-SIG field 20 according to an example of the present invention. The EHT-SIG field 20 may be generated by the transmitter TX in FIG. 1. The EHT-SIG field 20 may comprise at least one content channel, and the at least one content channel may comprise at least one first content channel and at least one second content channel. As shown in FIG. 2, each content channel 200 comprises a common field 210 which comprises a resource unit (RU) assignment subfield 2100 for informing all scheduled STAs of an RU assignment of all current data bandwidths. Each content channel 200 may comprise a user specific field 220 which comprises a plurality of user fields 2200 for carrying transmission information of the specific scheduled STA(s) (e.g. resource). Each content channel 200 comprises a padding value 2202 for padding a length of the user specific field 220 to satisfy a format requirement of the EHT-SIG field 20.

In the IEEE 802.11 standard, each RU smaller than a 242-tone may (e.g. must) be assigned at least one scheduled STA. Accordingly, for a null RU, the transmitter TX may assign a null scheduled STA with a scheduled STA ID "2046" in the EHT-SIG field. For an RU greater than the 242-tone, the transmitter TX may assign a plurality of user fields to a plurality of content channels in the EHT-SIG field, to ensure that user field numbers carried by the plurality of content channels (i.e. lengths (e.g. sizes) of the plurality of content channels) are the same or similar. In one example, a load balance function may be for balancing lengths of the plurality of content channels. A length of the EHT-SIG field may be changed according to a result of an RU assignment and a result of a load balance. In one example, an excessively long length of the EHT-SIG field may make a Physical Layer Convergence Procedure (PLCP) have an excessively long length, resulting in a decrease in throughput.

Figure 3:
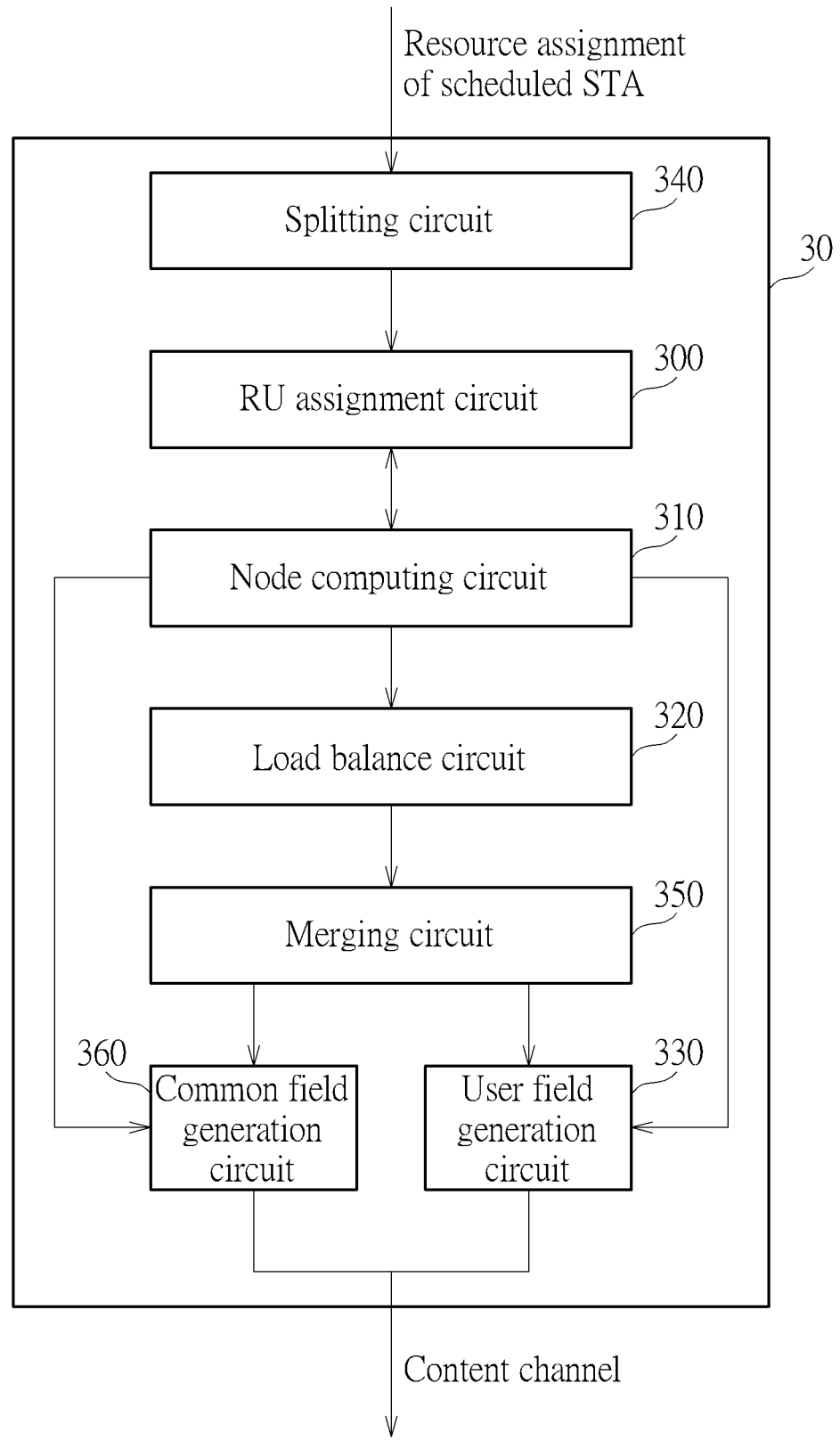
FIG. 3 is a schematic diagram of a content channel generation device according to an example of the present invention.

The RU assignment may improve an output rate by increasing bandwidth, and may improve bandwidth usage efficiency by supporting multiple RUs (MRU). The RU size comprises a 26-tone, a 52-tone, a 106-tone, a 242-tone, a 484-tone, a 996-tone, a 996×2-tone and a 996×4-tone. The MRU comprise a combination of a plurality of RUs, such as a 52+26-tone, a 106+26-tone, a 242+484-tone, a 996+484-tone, a 996×2+484-tone, a 996×3-tone, a 996×3+484-tone and a 996+484+242-tone, FIG. 3 is a schematic diagram of a content channel generation device 30 according to an example of the present invention. The content channel generation device 30 may be realized in the transmitter TX in FIG. 1, may generate the common field 210 and the user specific field 220 in FIG. 2 to generate the content channel 200, and may further generate the EHT-SIG field 20. The content channel generation device 30 may comprise an RU assignment circuit 300, a node computing circuit 310, a load balance circuit 320 and a user field generation circuit 330, and may comprise a splitting circuit 340, a merging circuit 350 and a common field generation circuit 360. In detail, the splitting circuit 340 is for generating a plurality of RUs according to a plurality of resource assignments. The RU assignment circuit 300 is coupled to the splitting circuit 340, and is for generating a full binary tree according to the plurality of RUs. The node computing circuit 310 is coupled to the RU assignment circuit 300, and is for generating a minimum full binary tree according to the full binary tree. The load balance circuit 320 is coupled to the node computing circuit 310, and is for generating a plurality of user field numbers corresponding to a plurality of content channels according to the minimum full binary tree and a load balance function. The merging circuit 350 is coupled to the load balance circuit 320, and is for generating a traversal result(s) of the minimum full binary tree according to a traversal algorithm and generating a merged traversal result according to the traversal result(s). The common field generation circuit 360 is coupled to the merging circuit 350, and is for generating a resource assignment indicator according to the merged traversal result to generate a valid common field. The common field generation circuit 360 is further coupled to the node computing circuit 310, to obtain (e.g. store) node information.

In one example, the RU assignment circuit 300 may be for assigning (e.g. locating) the plurality of RUs as at least one node in the full binary tree according to the traversal algorithm. The traversal algorithm may comprise the following operations: the RU assignment circuit 300 establishes (e.g. determines and generates) a full binary tree according to a rule that an RU size of a child node is not larger than an RU size of a parent node, wherein an RU with the smallest size (e.g. 26-tone) is determined as a leaf node and an adjacent RU(s) is determined as a sibling node(s). Each of the plurality of RUs corresponds to a node of the full binary tree. In one example, the node corresponds to at least one user field, i.e. each of the plurality of RUs may correspond to one or more user fields.

In one example, the content channel generation device 30 may comprise a receiving circuit. The receiving circuit is coupled to the splitting circuit 340, and receives the plurality of resource assignments of a plurality of scheduled STAs (e.g. transmitted by an upper layer, such as a Media Access Control (MAC) layer). In one example, the operation of the merging circuit 350 to generate the merged traversal result according to the traversal result comprises: the merging circuit 350 merges at least one leaf node of the plurality of leaf nodes (e.g. stored information) to generate the merged traversal result, when at least one first scheduled STA identity (ID) stored by the at least one leaf node is the same. In one example, the common field generation circuit 360 checks a resource assignment table according to the merged traversal result, and generates the resource assignment indicator according to the merged traversal result and a comparison result of the resource assignment table. In one example, the resource assignment table may comprise a plurality of resource assignment indicators and a plurality of RU numbers. Each of the plurality of resource assignment indicators corresponds to an RU set, and each of the RU sets comprises at least one RU and/or at least one MRU. In one example, the resource assignment table is defined by the 802.11 standard (e.g. the table 36-34 of P802.11be_D1.1).

In one example, the user field generation circuit 330 is coupled to the merging circuit 350, and is for generating a plurality of user fields corresponding to the plurality of content channels according to the traversal result. The user field generation circuit 330 is further coupled to the node computing circuit 310 to obtain (e.g. store) the node information. In one example, the user field generation circuit 330 maintains a first leaf node of the plurality of leaf nodes according to a plurality of scheduled STA IDs stored by the plurality of leaf nodes and a plurality of MRU information, and generates the plurality of user field according to the first leaf node. In one example, the operation of the user field generation circuit 330 to generate the plurality of user field further comprises: the user field generation circuit 330 deletes at least one second leaf node of the plurality of leaf nodes according to the plurality of scheduled STA IDs stored by the plurality of leaf nodes and the plurality of MRU information.

In one example, each of the plurality of MRU information comprises an MRU flag. The MRU flag may comprise 2 bits for indicating that an RU corresponding to a node is a non-MRU, a beginning resource location of an MRU, a middle resource location of an MRU or an end resource location of an MRU. In one example, an RU corresponding to a node is a non-MRU, an MRU that is a beginning resource location, an MRU that is a middle resource location or an MRU that is an end resource location, when the 2 bits in the MRU flags are "00", "01", "10" or "11", respectively.

In one example, the traversal comprises a binary tree pre-order traversal algorithm. In one example, the traversal may comprise a binary tree mirrored pre-order traversal algorithm. In one example, an arrangement order of a plurality of tones corresponding to a plurality of user fields may be an ascending order, i.e. the arrangement order of the plurality of tones corresponding to the plurality of user fields is from the smallest tone to the greatest tone (e.g. from the most negative tone to the most positive tone).

In one example, the load balance function may be realized according to an equation (Eq. 1):

$$\min\max_{X,Y}\{L_1^1, L_2^1, L_1^2, L_2^2, L_1^3, L_2^3, L_1^4, L_2^4\}, \qquad \text{(Eq. 1)}$$

$$s.t. \sum_{s \in S}(x_i^s + y_i^s) \cdot (z_i^s) = k_i, \forall i \in \mathcal{L}$$

$$x_i^s \in N, \forall i \in \mathcal{L}, \forall s \in S$$

$$y_i^s \in N, \forall i \in \mathcal{L}, \forall s \in S$$

$$z_i^s \in \{1, \infty\}, \forall i \in \mathcal{L}, \forall s \in S$$

wherein $\mathcal{L}$ is an RU index indicating an RU with an RU size greater than the 242-tone (e.g. the 484-tone, the 996-tone, the 996×2-tone or the 996×4-tone) or an MRU with an RU size greater than the 242-tone (e.g. the 484+242-tone, the 996+484-tone, the 996×2+484-tone, the 996×3-tone or the 996×3+484-tone); S is a set of indexes of a bandwidth divided by an 80 MHz sub-bandwidth (e.g. a bandwidth is 320 MHz, and S={1, 2, 3, 4});

$$L_1^s$$

is a user field number of a first content channel corresponding to an s-th 80 MHz sub-bandwidth;

$$L_2^s$$

is a user field number of a second content channel corresponding to the s-th 80 MHz sub-bandwidth; $k_i$ is a user field number configured to an i-th node, and the user field number corresponds to an RU or an MRU with an RU size greater than the 242-tone;

$$z_i^s$$

is a weight value indicating whether the i-th node corresponds to the s-th 80 MHz sub-bandwidth;

$$x_i^s$$

is a user field number of the i-th node corresponding to an RU configured to the first content channel; $y_i$ is a user field number of the i-th node corresponding to an RU configured to the second content channel; and N is the set of all natural numbers. In one example, the load balance function may be realized according to a transformation (e.g. simplification) of the equation (Eq. 1).

Figure 4:
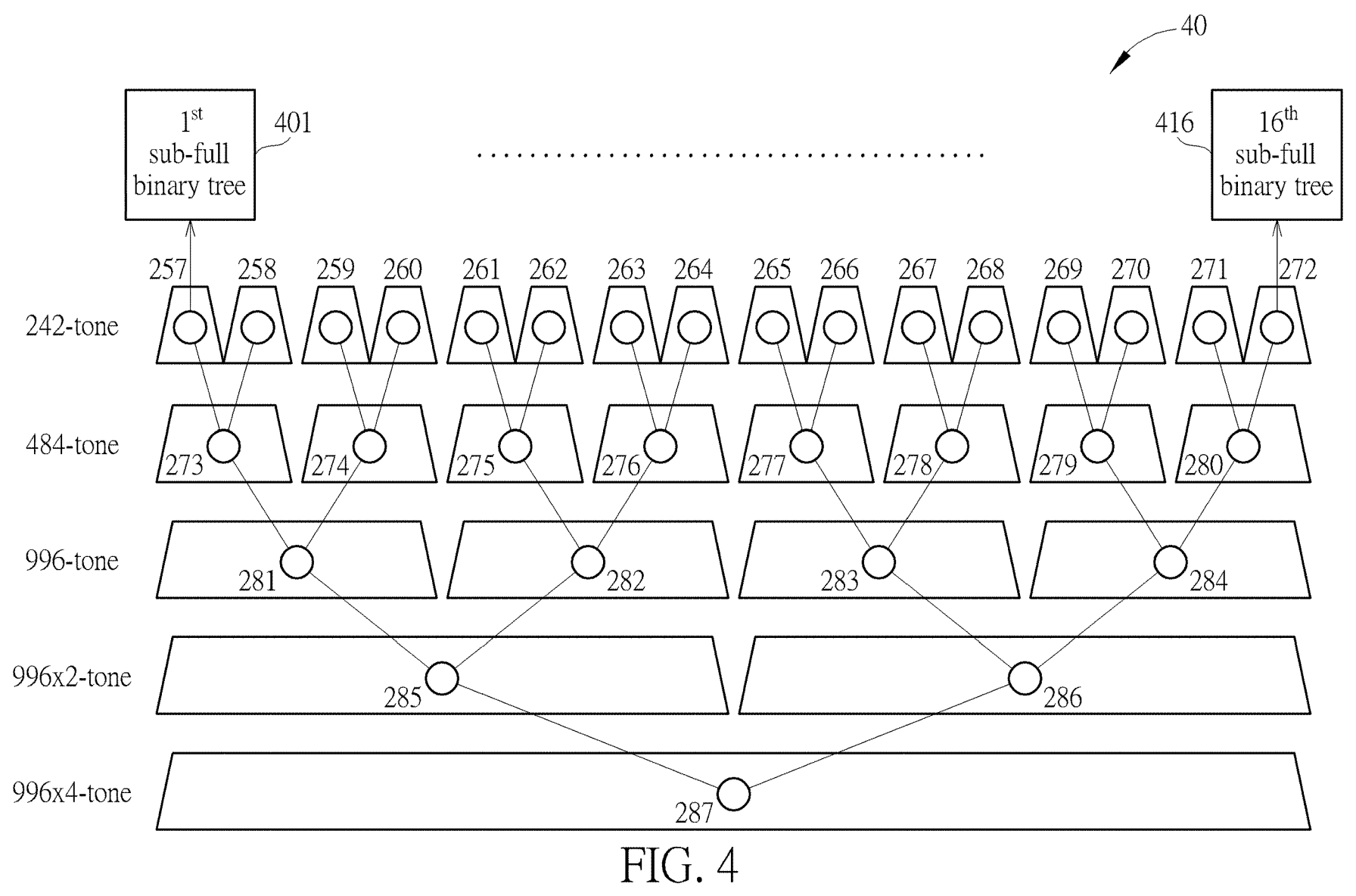

FIG. 4 is a schematic diagram of a full binary tree 40 for a plurality of resource units in a 320 MHz bandwidth according to an example of the present invention. As shown in FIG. 4, RUs are shown as trapezoids, and comprise six levels from top to bottom, i.e. sixteen sub-full binary trees, sixteen 242-tone RUs (e.g. comprising 242 subcarriers), eight 484-tone RUs, four 996-tone RUs, two 996×2-tone RUs and one 996×4-tone RU. Each of the 242-tone RU is a root node of a sub-full binary tree. Each of the RUs has an RU index (e.g. corresponding to a tone defined by the 3GPP standard or a subsequent version, a tone determined by the transmitter TX or a tone defined by the 802.11 standard), such as RU indexes 257-287 in FIG. 4. In addition, a full binary tree is shown as a tree structure, which comprises a plurality of nodes. As shown in FIG. 4, a plurality of nodes corresponds to the plurality of the RUs, respectively. That is, each RU corresponds to a node in the full binary tree.

Figure 5:
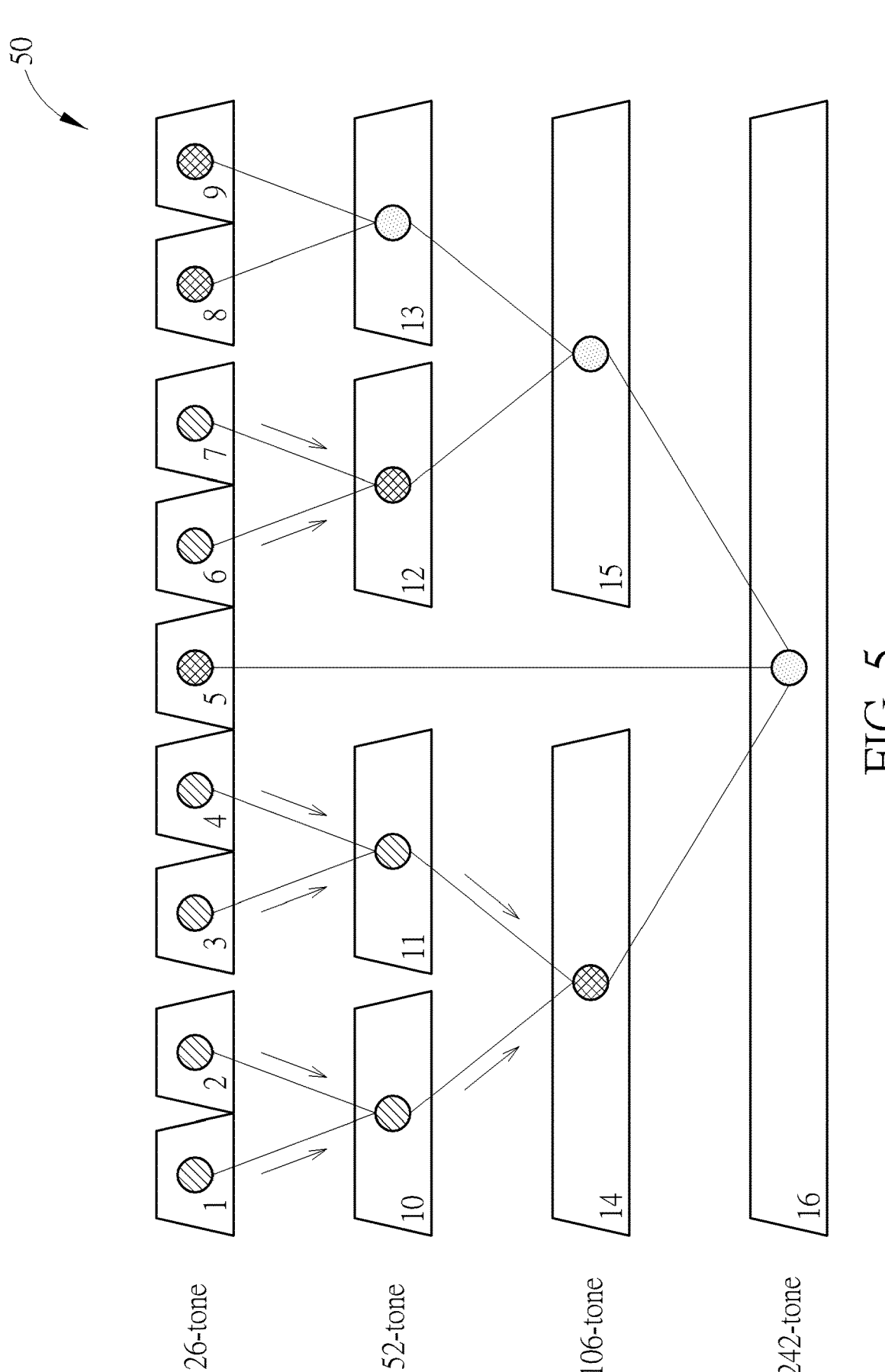
FIG. 5 is a schematic diagram of a full binary tree for a plurality of resource units in a 20 MHz bandwidth according to an example of the present invention.

FIG. 5 is a schematic diagram of a full binary tree 50 for a plurality of resource units in a 20 MHz bandwidth according to an example of the present invention. The full binary tree 50 may realize any of the 16 sub-full binary trees in FIG. 4. In FIG. 5, RUs are shown as trapezoids, and comprise nine 26-tone RUs, four 52-tone RUs, two 106-tone RUs and one 242-tone RU from top to bottom. Any of the 26-tone RUs may be composed of two 13-tone RUs. Each of the RUs has an RU index (e.g. corresponding to a tone defined by the 3GPP standard or a subsequent version, a tone determined by the transmitter TX or a tone defined by the 802.11 standard), such as RU indexes 1-16 in FIG. 5. In addition, in FIG. 5, a full binary tree is shown as a tree structure, which comprises circles filled with diagonal stripes (referred to as diagonal stripe circles hereinafter), circles filled with grids (referred to as grid circles hereinafter) and circles filled with dots (referred to as dotted circles hereinafter). The diagonal stripe circles represent null nodes, grid circles represent nodes for which scheduled STAs are configured, and the dotted circles represent reserved nodes. An arrow in FIG. 5 represents an incorporation of one node into another. A tree structure of the incorporated nodes may (e.g. must) fulfill the structure of the full binary tree. As shown in FIG. 5, one or two RUs correspond to one node in the full binary tree.

Figure 6:
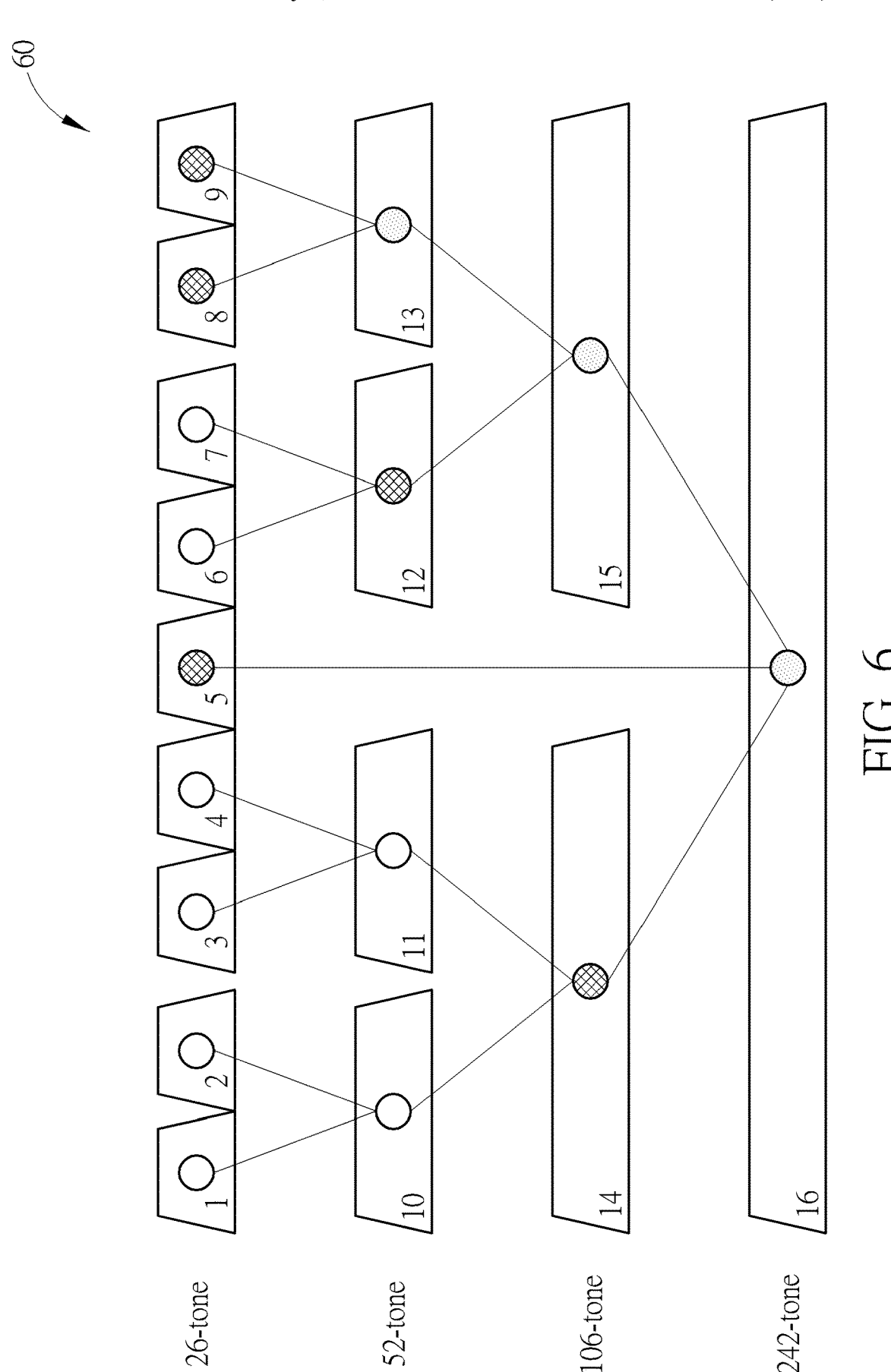
FIG. 6 is a schematic diagram of a minimum full binary tree according to an example of the present invention.

FIG. 6 is a schematic diagram of a minimum full binary tree 60 according to an example of the present invention. In FIG. 6, RUs and their RU indexes are shown in the same method, and are not narrated herein. Different from FIG. 5, the full binary tree comprises unfilled circles. The unfilled circles represent null leaf nodes after incorporating nodes. After removing (e.g. deleting) the null leaf nodes (e.g. nodes 1-4, 6, 7, 10, 11), the remaining node may generate a minimum full binary tree.

FIG. 7 is a resource assignment table 70 according to an example of the present invention. There are resource assignment indicators 700, e.g. 0 (00000000)-55 (000110111) and 96-103 (001100$y_2y_1y_0$), in the resource assignment table 70, but these are not limited herein. There are further RU numbers 710, e.g. 1-9, in the resource assignment table 70. Each of the resource assignment indicators 700 corresponds to an RU set, and each of the RU sets comprises at least one RU and/or at least one MRU. It should be noted that the resource assignment table 70 is defined by the 802.11 standard (e.g. the table 37-34 of P802.11be_D1.1)

The following illustrates how the content channel generation device 30 generates the common field 210 according to FIGS. 4-7. First, the receiving circuit receives a plurality of resource assignments (e.g. {[106+26][52+26][26]}) of a plurality of scheduled STAs (e.g. {1, 2, 3}) of an upper layer. The splitting circuit 340 generates a plurality of RUs (e.g. {[106], [26], [52], [26], [26]}) according to (e.g. by splitting) the plurality of resource assignments. The RU assignment circuit 300 generates a full binary tree (e.g. FIG. 5) according to the plurality of RUs (e.g. by assigning the plurality of RUs according to the traversal algorithm). The plurality of RUs corresponds to a plurality of nodes in the full binary tree. For example, the RU [106] corresponds to a node with an RU index 14 in the full binary tree, the RU [52] corresponds to a node with an RU index 12 in the full binary tree, and the RUs [26], [26] and [26] correspond to nodes with RU indexes 5, 8 and 9 in the full binary tree, respectively. For brevity, a node corresponding to an RU index X in the full binary tree is referred to as a node X.

In addition, the plurality of nodes stores a plurality of scheduled STA IDs and a plurality of MRU information. For example, the node 14 stores an ID of a scheduled STA 1 and MRU information indicating that an RU of the node 14 is an MRU, indicating that the MRU is a beginning resource location. The node 5 stores the ID of the scheduled STA 1 and MRU information indicating that an RU of the node 5 is an MRU and indicating that the MRU is an end resource location. The node 12 stores an ID of the scheduled STA 2 and MRU information indicating that an RU of the node 12 is an MRU and indicating that the MRU is a beginning resource location. The node 8 stores the ID of the scheduled STA 2 and MRU information indicating that an RU of the node 8 is an MRU and indicating that the MRU is an end resource location. The node 9 stores an ID of a scheduled STA 3 and MRU information indicating that an RU of the node 9 is a non-MRU.

Then, the node computing circuit 310 generates a minimum full binary tree (e.g. FIG. 6) according to (e.g. by incorporating) the full binary tree. A method in which the node computation circuit 310 generates the minimum full binary tree according to the full binary tree can be known by referring to patent application Ser. No. 17/211,852 Publication No. US20210349754A1. The load balance circuit 320 generates a plurality of user field numbers corresponding to a plurality of content channels according to the minimum full binary tree and a load balance function. In the case that the bandwidth is 20 MHz, there is only a single content channel. Thus, the load balance circuit 320 may not need to perform the load balance for the "plurality" of content channels to generate a plurality of user field numbers corresponding to the plurality of content channels, i.e. the load balance circuit 320 may generate a user field number corresponding to the single content channel, and the user field number is a length of the content channel. In other words, the load balance is used for optimizing bandwidths greater than 20 MHz (e.g. 40 MHz, 80 MHz, 160 MHz or 320 MHz).

The following uses an example to describe how the load balance circuit 320 generates the user field number corresponding to a single content channel. The user field number of the node 9 is 1 ($N_9$=1). The nodes 8 and 12 belong to the same scheduled STA and have the same user field, and the user field numbers of the nodes 8 and 12 are 1 ($N_8$=1, $N_{12}$=1). The nodes 5 and 14 belong to the same scheduled STA and have the same user field, and the user field numbers of the nodes 5 and 14 are 1 ($N_5$=1, $N_{14}$=1). The sum of the user field numbers of the node 9, the node 8 (or the node 12)

and the node 5 (or the node 14) is 3. Thus, the load balance circuit 320 may generate the user field number "3" corresponding to a single content channel, i.e. the length of the content channel is 3. The above user field numbers of the node 9, the node 8 (or the node 12) and the node 5 (or the node 14) are only used for illustrating the present example, and are not limited herein.

In addition, the merging circuit 350 generates the traversal result of the minimum full binary tree according to the traversal algorithm. The traversal result of the minimum full binary tree is the node 14, the node 5, the node 12, the node 8, the node 9, the node 13, the node 15 and the node 16, wherein a traversal order of the leaf nodes is the node 14, the node 5, the node 12, the node 8, and the node 9. The merging circuit 350 generates the merged traversal result according to the traversal result. In detail, the merging circuit 350 generates the RU [26] according to the ID of the scheduled STA 3 stored by the node 9 and the MRU information indicating that the RU of the node 9 is a non-MRU. The merging circuit 350 merges the nodes 8 and 12 to generate the RU [52+26] according to the ID of the scheduled STA 2 stored by the nodes 8 and 12, the MRU information indicating that the node 12 is an MRU beginning and the MRU information indicating that the node 8 is an MRU end. The merging circuit 350 merges the nodes 14 and 5 to generate the RU [106+26] according to the ID of the scheduled STA 1 stored by the nodes 5 and 14, the MRU information indicating that the node 14 is an MRU beginning and the MRU information indicating that the node 5 is an MRU end. The merging circuit 350 merges the RU [26], the RU [52+26] and the RU [106+26] to generate the merged traversal result {[106+26][52+26][26]}.

The common field generation circuit 360 checks the resource assignment table (e.g. FIG. 7) according to the merged traversal result {[106+26][52+26][26]}. The common field generation circuit 360 determines that the merged traversal result {[106+26][52+26][26]} is the same as (or most similar to) an RU set {[106+26][52+26][26]} corresponding to a resource assignment indicator 49 (000110001) according to the merged traversal result and the comparison result of the resource assignment table. Thus, the common field generation circuit 360 generates the resource assignment indicator 49 (000110001). In this way, an RU assignment sub-field in the common field may be generated.

The following illustrates how the content channel generation device 30 generates the content channel 200 according to FIGS. 4-7. The user field generation circuit 330 generates the user fields of the scheduled STAs corresponding to the node 14, the node 5, the node 12, the node 8 and the node 9, respectively, according to the above traversal order of the leaf nodes (i.e. the node 14, the node 5, the node 12, the node 8 and the node 9). The user field generation circuit 330 maintains the node 12, deletes the node 8, and generates the user field of the scheduled STA corresponding to the node 12 when generating the user field of the scheduled STA corresponding to the nodes 8 and 12 (since the ID of the scheduled STA 2 stored by the node 8 is the same as the ID of the scheduled STA 2 stored by the node 12, since the MRU information stored by the node 8 indicates that the RU of the node 8 is an MRU and indicates that the MRU is an end resource location, and since the MRU information stored by the node 12 indicates that the RU of the node 12 is an MRU and indicates that the MRU is a beginning resource location). Similarly, the user field generation circuit 330 maintains the node 14, deletes the node 5, and generates the user field of the scheduled STA corresponding to the node 14 when generating the user field of the scheduled STA corresponding to the nodes 5 and 14 (since the ID of the scheduled STA 1 stored by the node 5 is the same as the ID of the scheduled STA 1 stored by the node 14, since the MRU information stored by the node 5 indicates that the RU of the node 5 is an MRU and indicates that the MRU is an end resource location, and since the MRU information stored by the node 14 indicates that the RU of the node 14 is an MRU and indicates that the MRU is a beginning resource location). In the case where the user field number of the leaf nodes is 3, the user specific fields 220 with three user fields may be generated. Thus, the content channel with the 20 MHz band may carry the common field 210 comprising the resource assignment indicator 49 (000110001) and the specific fields 220 comprising the user fields of the nodes 14, 12 and 9.

Figure 8:
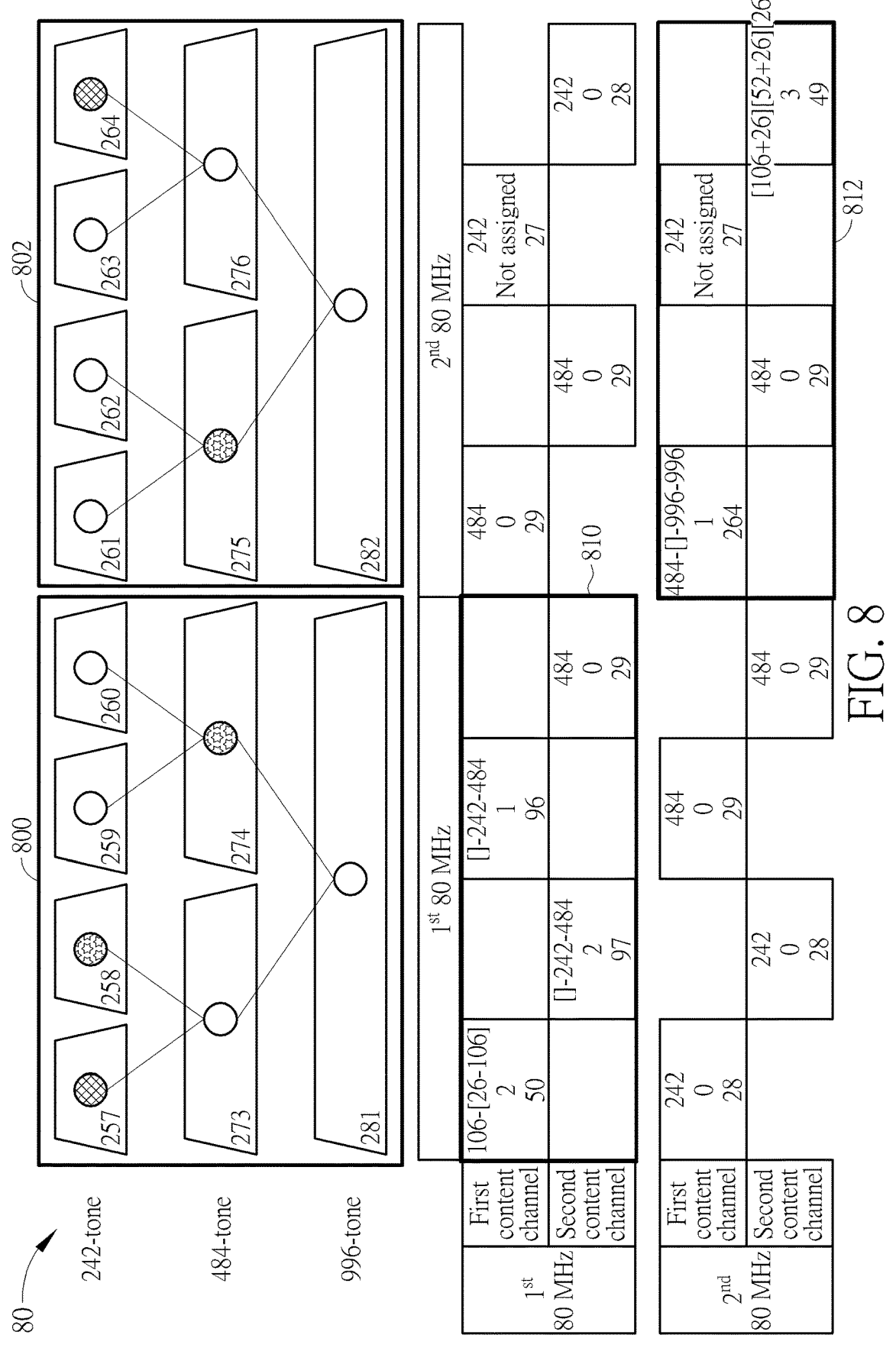
FIG. 8 is a schematic diagram of a minimum full binary tree generated by a plurality of resource units in a 320 MHz bandwidth according to an example of the present invention.

FIG. 8 is a schematic diagram of a minimum full binary tree 80 generated by a plurality of RUs in a 320 MHz bandwidth according to an example of the present invention. Due to the limited space, the minimum full binary tree 80 only shows eight 242-tone RUs, four 484-tone RUs and two 996-tone RUs corresponding to the 160 MHz bandwidth. The following illustrates how the content channel generation device 30 generates the common field 210 and the content channel 200 according to FIG. 8. First, the receiving circuit receives a plurality of resource assignments (e.g. {106–[106+26], [484+242], [996×2+484], [106+26][52+26][26]}) of a plurality of scheduled STAs (e.g. {(1, 2), (3, 4, 5), (6, 7, 8, 9), (10, 11, 12)}) of an upper layer. The scheduled STAs {[10, 11, 12]} and their resource assignments [106+26][52+26][26] may correspond to the scheduled STAs {[1, 2, 3]} and their resource assignments [106+26][52+26][26] in FIGS. 4-7. The user field numbers may be generated according to the example of FIGS. 4-7. The splitting circuit 340 generates a plurality of RUs according to (e.g. by splitting) the plurality of resource assignments. The RU assignment circuit 300 generates a full binary tree according to the plurality of RUs. The plurality of nodes stores a plurality of scheduled STA IDs and a plurality of MRU information. The node computation circuit 310 generates the minimum full binary tree (e.g. a minimum full binary tree 800 and a minimum full binary tree 802 in FIG. 8) according to (e.g. by incorporating) the full binary tree. A method in which the node computation circuit 310 generates the minimum full binary tree can be found by referring to the previously cited patent application, and is not narrated herein. Then, the load balance circuit 320 generates a plurality of user field numbers corresponding to a plurality of content channels according to the minimum full binary tree and a load balance function. In the case where the bandwidth is 320 MHz, the load balance circuit 320 generates a plurality of user field numbers corresponding to a plurality of content channels in units of 80 MHz. Thus, the minimum full binary tree 80 may be regarded as four minimum full binary trees (FIG. 8 only shows two minimum full binary trees corresponding to the 1st 80 MHz band and the 2nd 80 MHz band, i.e. the minimum full binary tree 800 and the minimum full binary tree 802).

The following uses an example to describe how to assign the plurality of user fields of nodes of the minimum full binary tree 800 to the plurality of content channels according to the load balance function. $N_i$ is a user field number of the scheduled STA(s) corresponding to the node i. The node 257 corresponds to the scheduled STAs (1, 2), and the user field number may be 2 ($N_{257}$=2). The nodes 258 and 274 correspond to the scheduled STAs (3, 4, 5), and the user field number may be 3 ($N_{258,274}$=3) The sum of the user field numbers of the nodes 257, 258 and 274 is 5. Under the assignment that the user field number carried by the first content channel is 3 and the user field number carried by the second content channel is 2 (e.g. the user fields of the node 257 and one of the user fields of the nodes 258 and 274 correspond to the first content channel, and the other two user fields of the nodes 258 and 274 correspond to the second content channel), the load balance function may generate (e.g. calculate) a minimum value of 3 according to the load balance function.

Then, in the minimum full binary tree 802, the node 275 corresponds to the scheduled STAs (6, 7, 8, 9), and the user field number may be up to 4 ($N_{275}$=4). The node 264 corresponds to the scheduled STAs (10, 11, 12), and the user field number may be 3 ($N_{264}$=3). The sum of the user field numbers of the nodes 275 and 264 is up to 7. It should be noted that the user field number of the node 275 corresponding to the scheduled STAs (6, 7, 8, 9), the 996-tone RU of the $3^{rd}$ 80 MHz band (not shown) (e.g. the node 283 in FIG. 4) and the 996-tone RU of the 4th 80 MHz band (not shown) (e.g. the node 284 in FIG. 4) may be up to 4 ($N_{275}$+$N_{283}$+$N_{284}$=4) Under the assignment that the user field number carried by the first content channel is 1 and the user field number carried by the second content channel is 3 (e.g. one of the user field(s) of the node 275 corresponds to the first content channel, and the user fields of the node 264 correspond to the second content channel), the load balance function may generate (e.g. calculate) a minimum value of 3 according to the load balance function. It should be noted that, in the case where the node 275 corresponds to an MRU, the other user field(s) (e.g. the user field(s) not corresponding to the content channel) may perform the load balance on the other 80 MHz bands (e.g. 80 MHz band corresponding to the other two minimum full binary trees not shown in FIG. 8). For example, in the case that the other user field number carried by the first content channel is 2 and the other user field number carried by the second content channel is 1, the load balance function may generate (e.g. calculate) a minimum value of 2 according to the load balance function in the other full binary tree. In the case where the bandwidth is 320 MHz, the length of the shortest content channel with a user field number 3 is generated according to the minimum value 3 of the user field number of the $1^{st}$ 80 MHz band, the minimum value 3 of the user field number of the $2^{nd}$ 80 MHz band, the minimum value 2 of the user field number of the $3^{rd}$ 80 MHz band and the minimum value 2 of the user field number of the $4^{th}$ 80 MHz band, since the length of the content channel is in units of 80 MHz upon which the content channel that carries a large user field number is based. In short, the above operation of generating the plurality of user field numbers corresponding to the plurality of content channels according to the minimum full binary tree 80 and the load balance function may be used for balancing the user field number carried by each content channel, and comprises at least the following operation of: (1) balancing the user field numbers carried by two content channels according to the load balance function in each 80 MHz band, to ensure that the user field numbers carried by the two content channels are the same or similar; (2) balancing the user field numbers carried by the plurality of content channels according to the load balance function in all bandwidths (e.g. four 80 MHz bands in the 320 MHz band in FIG. 8), to ensure that the user field numbers carried by the plurality of content channels are the same or similar. The above scheduled STAs, the plurality of resource assignments and the user field numbers are only provided as an example, and are not limited herein.

Further, the merging circuit 350 generates a traversal result of the minimum full binary tree 80 according to the traversal algorithm. The merging circuit 350 generates a traversal result of a minimum full binary tree in units of 20 MHz (e.g. the node 257 and its subtree). The merging circuit 350 generates a merged traversal result according to the node 257 and its subtree. The merged traversal result is {[106][106+26]}. The common field generation circuit 360 checks the resource assignment table (e.g. FIG. 7) according to the merged traversal result {[106][106+26]}. The common field generation circuit 360 determines that the merged traversal result {[106][106+26]} is the same as an RU set {[106][106+26]} corresponding to the resource assignment indicator 50 (000110010), according to the merged traversal result and the comparison result of the resource assignment table. Thus, the common field generation circuit 360 generates the resource assignment indicator 50 (000110010), and the RU assignment subfield in the common field 210 may be generated.

Similarly, a merged traversal result generated by the merging circuit 350 according to a traversal result of the node 258 and its subtree is {[ ][242][484]}. The common field generation circuit 360 checks the resource assignment table (e.g. FIG. 7) according to the merged traversal result {[ ][242][484]}. The common field generation circuit 360 determines that the merged traversal result {[ ][242][484]} is the same as an RU set {[ ][242][484] } corresponding to the resource assignment indicators 96-103 (0001100$y_2y_1y_0$), according to the merged traversal result and the comparison result of the resource assignment table. In the case where the user field number of the node 258 is 2, the common field generation circuit 360 generates the resource assignment indicator 97 (0001100001). In this way, the RU assignment subfield in the common field 210 may be generated.

The following illustrates how the content channel generation device 30 generates the content channel 200 according to FIG. 8. In the case where the sum of user field numbers of the nodes 257, 258 and 274, is determined according to the load balance function, the first content channel may carry the user field(s) of the node 257 (e.g. the number of the plurality of scheduled STAs (1, 2) and the plurality of resource assignments 106-[106+26]) and one user field of the nodes 258 and 274, and the second content channel may carry the other two user fields of the nodes 258 and 274. Thus, the first content channel may carry the common field 210 comprising the resource assignment indicator 50 (000110010) and the user specific fields 220 comprising the user field(s) of the node 257, and may carry the common field 210 comprising the resource assignment indicator 96 (0001100000) and the user specific fields 220 comprising the one user field of the nodes 258 and 274. The second content channel may carry the common field 210 comprising the resource assignment indicator 97 (0001100001) and the user specific fields 220 comprising the other two user fields of the nodes 258 and 274, and may carry the common field 210 comprising the resource assignment indicator 29 (000011101). It should be noted that the RU with the size greater than the 242-tone (e.g. the 242-tone, the 484-tone, the 996-tone, the 996×2-tone or the 996×4-tone) may not carry the user field, when the resource assignment indicator corresponds to the null scheduled STA. The common fields, the user fields, the user field numbers and the corresponding content channels generated according to the minimum full binary tree 800 or the minimum full binary tree 802 can be referred to as the content channels 810 and 812 in FIG. 8.

Figure 9:
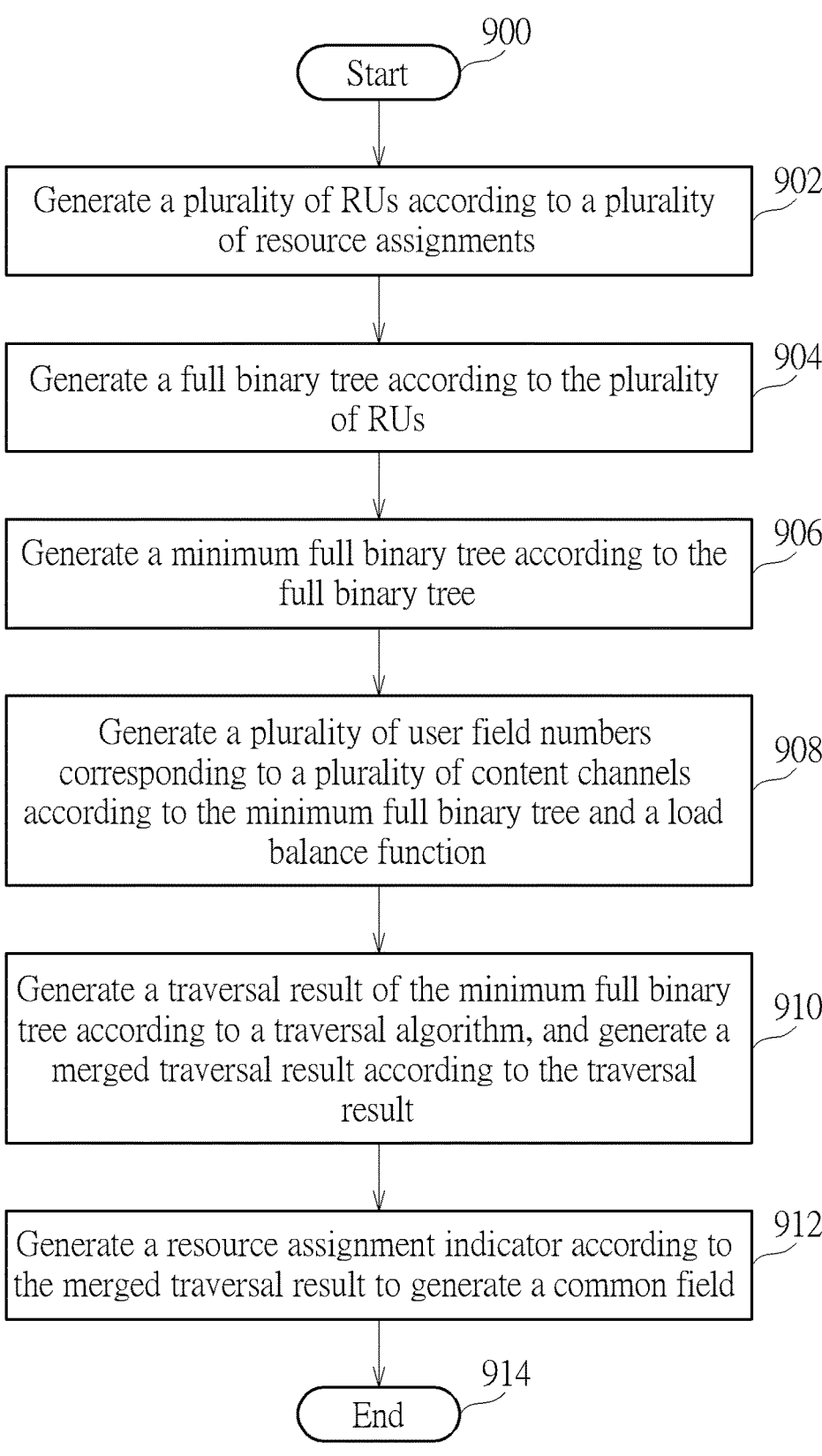
FIG. 9 is a flowchart of a process according to an example of the present invention.

Operations of the content channel generation device 30 in the above examples can be summarized into a process 90 shown in FIG. 9. The process 90 includes the following steps:

Step 900: Start.

Step 902: Generate a plurality of RUs according to a plurality of resource assignments.

Step 904: Generate a full binary tree according to the plurality of RUs.

Step 906: Generate a minimum full binary tree according to the full binary tree.

Step 908: Generate a plurality of user field numbers corresponding to a plurality of content channels according to the minimum full binary tree and a load balance function.

Step 910: Generate a traversal result of the minimum full binary tree according to a traversal algorithm, and generate a merged traversal result according to the traversal result to generate a user specific field.

Step 912: Generate a resource assignment indicator according to the merged traversal result to generate a common field.

Step 914: End.

The process 90 is used for illustrating a method of the content channel generation device 30 generating the content channel. Detailed description and variations of the process 90 can be known by referring to the previous description, and are not narrated herein. It should be noted that realizations of the content channel generation device 30 (and the circuits in the content channel generation device 30) are various. For example, the circuits mentioned above may be integrated into one or more circuits. In addition, the content channel generation device 30 may be realized by hardware (e.g. circuits), software, firmware (known as a combination of a hardware device, computer instructions and data that reside as read-only software on the hardware device), an electronic system or a combination of the devices mentioned above, but are not limited herein.

To sum up, the present invention provides a device and a method of performing the content channel generation. The device and the method of performing the content channel generation may generate the common field and the shortest user field efficiently, to thereby generate the shortest content channel and the shortest EHT-SIG field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A content channel generation device, comprising:

a splitting circuit, for generating a plurality of resource units (RUs) according to a plurality of resource assignments;

an RU assignment circuit, coupled to the splitting circuit, for generating a full binary tree according to the plurality of RUs;

a node computing circuit, coupled to the RU assignment circuit, for generating a minimum full binary tree according to the full binary tree;

a load balance circuit, coupled to the node computing circuit, for generating a plurality of user field numbers corresponding to a plurality of content channels according to the minimum full binary tree and a load balance function;

a merging circuit, coupled to the load balance circuit, for generating a traversal result of the minimum full binary tree according to a traversal algorithm, and for generating a merged traversal result according to the traversal result; and a common field generation circuit, coupled to the merging circuit, for generating a resource assignment indicator according to the merged traversal result to generate a common field;

wherein the traversal result comprises a plurality of leaf nodes, and the operation of the merging circuit to generate the merged traversal result according to the traversal result comprises:

merging at least one leaf node of the plurality of leaf nodes to generate the merged traversal result when at least one first scheduled STA identity (ID) stored by the at least one leaf node is the same.

2. The content channel generation device of claim 1, further comprising:

a receiving circuit, coupled to the splitting circuit, for receiving the plurality of resource assignments of a plurality of scheduled stations (STAs).

3. The content channel generation device of claim 1, wherein the operation of the common field generation circuit to generate the resource assignment indicator according to the merged traversal result comprises:

checking a resource assignment table according to the merged traversal result; and generating the resource assignment indicator according to the merged traversal result and a comparison result of the resource assignment table.

4. The content channel generation device of claim 1, further comprising:

a user field generation circuit, coupled to the merging circuit, for generating a plurality of user fields corresponding to the plurality of content channels according to the traversal result.

5. The content channel generation device of claim 4, wherein the traversal result comprises a plurality of leaf nodes, and the operation of the user field generation circuit to generate the plurality of user fields according to the traversal result comprises:

maintaining a first leaf node of the plurality of leaf nodes according to a plurality of scheduled STA IDs stored by the plurality of leaf nodes and a plurality of multiple RUs (MRU) information, and generating the plurality of user fields according to the first leaf node.

6. The content channel generation device of claim 5, wherein the operation of the user field generation circuit to generate the plurality of user field further comprises:

deleting at least one second leaf node of the plurality of leaf nodes according to the plurality of scheduled STA IDs stored by the plurality of leaf nodes and the plurality of MRU information.

7. The content channel generation device of claim 5, wherein each of the plurality of MRU information comprises an MRU flag.

8. The content channel generation device of claim 1, wherein the traversal algorithm comprises a binary tree pre-order traversal algorithm.

9. A method for performing a content channel generation, comprising:

generating a plurality of resource units (RUs) according to a plurality of resource assignments;

generating a full binary tree according to the plurality of RUs;

generating a minimum full binary tree according to the full binary tree;

generating a plurality of user field numbers corresponding to a plurality of content channels according to the minimum full binary tree and a load balance function;

generating a traversal result of the minimum full binary tree according to a traversal algorithm, and generating a merged traversal result according to the traversal result; and generating a resource assignment indicator according to the merged traversal result, to generate a common field;

wherein the traversal result comprises a plurality of leaf nodes, and the operation of generating the merged traversal result according to the traversal result comprises:

merging at least one leaf node of the plurality of leaf nodes to generate the merged traversal result when at least one first scheduled STA identity (ID) stored by the at least one leaf node is the same.

10. The method of claim 9, further comprising:

receiving the plurality of resource assignments of a plurality of scheduled stations (STAs).

11. The method of claim 9, wherein the operation of generating the resource assignment indicator according to the merged traversal result comprises:

checking a resource assignment table according to the merged traversal result; and generating the resource assignment indicator according to the merged traversal result and a comparison result of the resource assignment table.

12. The method of claim 9, further comprising:

generating a plurality of user fields corresponding to the plurality of content channels according to the traversal result.

13. The method of claim 12, wherein the traversal result comprises a plurality of leaf nodes, and the operation of generating the plurality of user field according to the traversal result comprises:

maintaining a first leaf node of the plurality of leaf nodes according to a plurality of scheduled STA IDs stored by the plurality of leaf nodes and a plurality of multiple RUs (MRU) information, and generating the plurality of user fields according to the first leaf node.

14. The method of claim 13, wherein the operation of generating the plurality of user field further comprises:

deleting at least one second leaf node of the plurality of leaf nodes according to the plurality of scheduled STA IDs stored by the plurality of leaf nodes and the plurality of MRU information.

15. The method of claim 13, wherein each of the plurality of MRU information comprises a MRU flag.

16. The method of claim 9, wherein the traversal algorithm comprises a binary tree pre-order traversal algorithm.

* * * * *